(12) United States Patent
Park et al.

(10) Patent No.: US 9,544,804 B2
(45) Date of Patent: Jan. 10, 2017

(54) METHOD AND APPARATUS FOR TRANSMITTING AND RECEIVING POWER HEADROOM REPORT IN A WIRELESS COMMUNICATION SYSTEM

(71) Applicant: LG ELECTRONICS INC., Seoul (KR)

(72) Inventors: Sungjun Park, Gyeonggi-do (KR); Sunghoon Jung, Gyeonggi-do (KR); Seungjune Yi, Gyeonggi-do (KR); Youngdae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 14/241,359

(22) PCT Filed: Sep. 25, 2012

(86) PCT No.: PCT/KR2012/007696
§ 371 (c)(1),
(2) Date: Feb. 26, 2014

(87) PCT Pub. No.: WO2013/048081
PCT Pub. Date: Apr. 4, 2013

(65) Prior Publication Data
US 2014/0211738 A1    Jul. 31, 2014

Related U.S. Application Data

(60) Provisional application No. 61/539,447, filed on Sep. 26, 2011.

(51) Int. Cl.
*H04W 4/00* (2009.01)
*H04W 24/10* (2009.01)
*H04W 52/36* (2009.01)
*H04W 52/18* (2009.01)

(52) U.S. Cl.
CPC ............ *H04W 24/10* (2013.01); *H04W 52/18* (2013.01); *H04W 52/365* (2013.01)

(58) Field of Classification Search
USPC ........................................................ 370/329
See application file for complete search history.

(56) References Cited

U.S. PATENT DOCUMENTS

2011/0134774 A1\* 6/2011 Pelletier ............. H04W 52/365
                                                                    370/252
2011/0243016 A1\* 10/2011 Zhang ................. H04W 52/365
                                                                    370/252
(Continued)

FOREIGN PATENT DOCUMENTS

KR    2009-0131653 A    12/2009
KR    2010-0041775 A    4/2010
(Continued)

*Primary Examiner* — Gregory Sefcheck
*Assistant Examiner* — Majid Esmaeilian
(74) *Attorney, Agent, or Firm* — Dentons US LLP

(57) ABSTRACT

The invention relates to a wireless communication system. A method for transmitting a power headroom report (PHR) from a terminal according to an embodiment of the present invention may include determining whether a time alignment timer (TAT) for a serving cell is operating; and transmitting, to a base station, a PHR including only the PHR on the serving cell in which the TAT is operating.

7 Claims, 11 Drawing Sheets

(56) References Cited

U.S. PATENT DOCUMENTS

| | | | | |
|---|---|---|---|---|
| 2012/0040707 A1* | 2/2012 | Kim | .................... | H04W 52/365 |
| | | | | 455/522 |
| 2012/0082046 A1* | 4/2012 | Ho | ...................... | H04W 52/367 |
| | | | | 370/252 |
| 2012/0207112 A1* | 8/2012 | Kim | .................... | H04W 52/146 |
| | | | | 370/329 |
| 2013/0176953 A1* | 7/2013 | Stern-Berkowitz | . | H04W 52/146 |
| | | | | 370/329 |

FOREIGN PATENT DOCUMENTS

| KR | 2010-0104351 A | 9/2010 |
|---|---|---|
| KR | 2011-0039172 A | 4/2011 |

* cited by examiner component carrier five component carriers → 100 MHz

FIG. 10

| $C_7$ | $C_6$ | $C_5$ | $C_4$ | $C_3$ | $C_2$ | $C_1$ | R |
|---|---|---|---|---|---|---|---|
| P | V | PH (Type 2, PCell) | | | | | |
| R | R | $P_{CMAX,c}$ 1 | | | | | |
| p | V | PH (Type 1, PCell) | | | | | |
| R | R | $P_{CMAX,c}$ 2 | | | | | |
| p | V | PH (Type 1, SCell 1) | | | | | |
| R | R | $P_{CMAX,c}$ 3 | | | | | |

. . .

| p | V | PH (Type 1, SCell n) |
|---|---|---|
| R | R | $P_{CMAX,c}$ m |

US 9,544,804 B2

METHOD AND APPARATUS FOR TRANSMITTING AND RECEIVING POWER HEADROOM REPORT IN A WIRELESS COMMUNICATION SYSTEM

This application is a 35 USC §371 National Stage entry of International Application No. PCT/KR2012/007696, filed on Sep. 25, 2012, which claims priority to U.S. Provisional Application No. 61/539,447, filed on Sep. 26, 2011, both of which are hereby incorporated by reference in its entirety.

TECHNICAL FIELD

The present invention relates to a wireless communication system, and more particularly, to a method and apparatus for transmitting and receiving a power headroom report.

BACKGROUND ART

In order to normally receive an uplink signal from a user equipment and minimize interference of uplink transmission of the user equipment with another user equipment, an uplink transmission power from the user equipment to a base station may be controlled by the base station. To this end, the user equipment may transmit a power headroom report (PHR) to the base station, and the base station may receive the PHR from the user equipment. The power headroom means a power that may be used additionally to the power currently transmitted from the user equipment.

DISCLOSURE

Technical Problem

As described above, since a PHR relates to uplink transmission of the user equipment, unnecessary resources may be consumed in case that the PHR is required even if uplink transmission is not performed. According to a PHR method which is currently defined, a problem occurs in that the PHR is generated and performed even in case that uplink transmission is not performed.

An object of the present invention is to provide a method and apparatus for generating and providing a necessary PHR only.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the specification, as embodied and broadly described herein, according to one embodiment of the present invention, a method for transmitting a power headroom report (PHR) from a user equipment comprises the steps of determining whether a time alignment timer (TAT) for a serving cell is running; and transmitting, to a base station, a PHR including only power headroom information on the serving cell of which TAT is running To achieve these objects and other advantages and in accordance with the purpose of the specification, as embodied and broadly described herein, according to another embodiment of the present invention, a method for allowing a base station to control an uplink transmission power of a user equipment comprises the steps of receiving a power headroom report (PHR), which includes power headroom information only for a serving cell of which TAT is running, from the user equipment; and transmitting uplink transmission power control information determined on the basis of the PHR to the user equipment.

To achieve these objects and other advantages and in accordance with the purpose of the specification, as embodied and broadly described herein, according to still another embodiment of the present invention, a user equipment for transmitting a power headroom report (PHR) comprises a reception module configured to receive a downlink signal from a base station; a transmission module configured to transmit an uplink signal to the base station; and a processor configured to control the user equipment, which includes the reception module and the transmission module, wherein the processor is configured to determine whether a time alignment timer (TAT) for a serving cell is running and transmit, to a base station, a PHR including only power headroom information on the serving cell of which TAT is running To achieve these objects and other advantages and in accordance with the purpose of the specification, as embodied and broadly described herein, according to further still another embodiment of the present invention, a base station for controlling an uplink transmission power of a user equipment comprises a reception module configured to receive an uplink signal from a user equipment; a transmission module configured to transmit a downlink signal to the user equipment; and a processor configured to control the base station, includes the reception module and the transmission module, wherein the processor is configured to receive a PHR, which includes only power headroom information on the serving cell of which TAT is running, from the user equipment through the reception module, and is configured to transmit uplink transmission power control information determined on the basis of the PHR to the user equipment through the transmission module.

The followings may commonly be applied to the aforementioned embodiments according to the present invention.

The method may further comprise the step of determining whether a PHR trigger condition is satisfied, and the step of transmitting a PHR may be performed if the PHR trigger condition is satisfied.

The PHR trigger condition may include a case where a prohibitPHR-timer expires or has expired and whether path loss has changed more than a predetermined reference value for at least one activated serving cell which is used as a path loss reference since the last transmission of the PHR when the user equipment has uplink resources for new transmission.

Whether pass loss has changed to exceed a predetermined value may be determined for only the serving cell of which TAT is running The serving cell used as the path loss reference may be configured by the base station through upper layer signaling.

The predetermined reference value may be set by the base station through upper layer signaling.

The PHR trigger condition may include a case whether an uplink is configured for the serving cell and the serving cell has been activated.

Wherein whether the serving cell has been activated may be determined for only the serving cell of which TAT is running The PHR trigger condition may include a case whether a time alignment procedure for the serving cell has been performed for the first time after the last activation of the serving cell.

The step of determining whether the TAT of the serving cell configured for the user equipment is running may include determining whether a time synchronization procedure for the serving cell has been performed for the first time after the last activation of the serving cell.

One or more serving cells may be configured for the user equipment, whether the TAT is running for each of the one or more serving cells may be determined, and the PHR, which includes power headroom information only for each of the one or more serving cells where the TAT is running, may be transmitted to the base station.

The TAT may be defined for a timing advance group (TAG) to which the serving cell belongs.

The aforementioned description of the present invention and its detailed description, which will be made later, are only exemplary, and are intended for additional description of claims.

Advantageous Effects

According to the present invention, the method and apparatus for generating and providing a necessary PHR only may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 10 is a diagram illustrating a format of an extended PHR MAC CE;

BEST MODE FOR CARRYING OUT THE INVENTION

Figure 1:
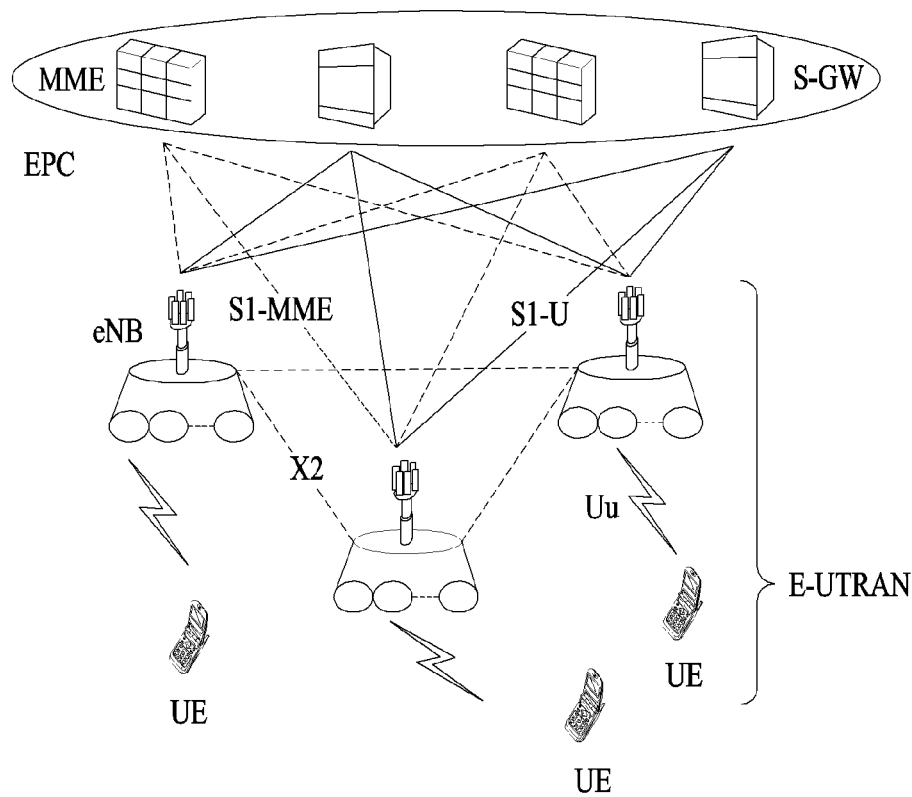
FIG. 1 is a diagram illustrating a structure of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station BS or network nodes other than the base station. At this time, the base station BS may be replaced with terms such as a fixed station, Node B, eNode B (eNB), and an access point (AP). A relay may be replaced with terms such as a relay node (RN) and a relay station (RS). Also, the user equipment UE may be replaced with terms such as a terminal, a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Structure of LTE System

A system structure of an LTE system, which is an example of the wireless communication system to which the present invention may be applied, will be described with reference to FIG. 1. The LTE system is a mobile communication system evolved from the UMTS. As shown in FIG. 1, the LTE system may be divided into E-UTRAN (Evolved UMTS Terrestrial Radio Access Network) and EPC (Evolved Packet Core). The E-UTRAN includes a user equipment UE and eNB (Evolved NodeB, base station). An interface between the UE and the eNB may be referred to as Uu interface, and an interface between eNBs may be referred to as X2 interface. The EPC includes a mobility management entity (MME) and a serving-gateway (S-GW), wherein the MME serves as a control plane and the serving gateway serves as a user plane. An interface between the eNB and the MME may be referred to as S1-MME interface, and an interface between the eNB and the S-GW may be referred to as S1-U interface. The Sl-MME interface and the S1-U interface may be referred to as S1 interface.

Figure 2:
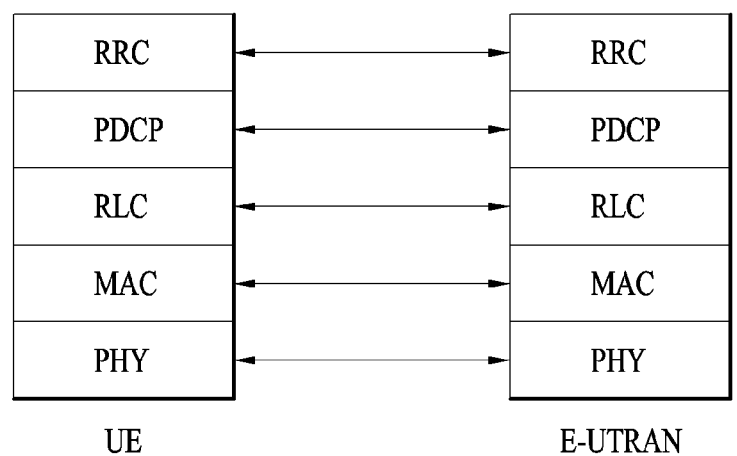
FIG. 2 is a diagram illustrating a control plane of a radio protocol.
Figure 3:
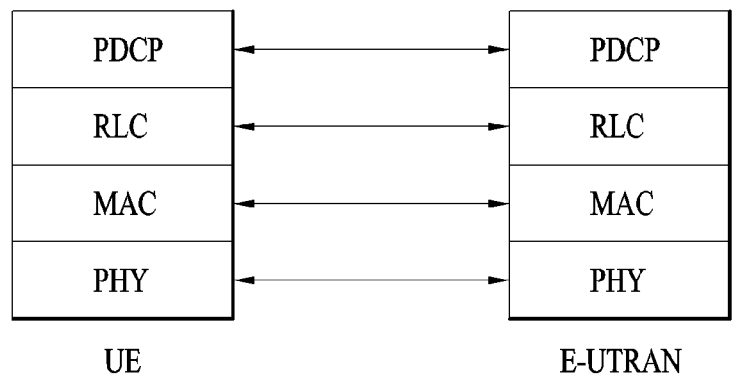
FIG. 3 is a diagram illustrating a user plane of a radio protocol.

A radio interface protocol is defined in the Uu interface which is a radio interval, and horizontally includes a physical layer, a data link layer, and a network layer, and vertically includes a user plane for data information transfer and a control plane for signaling transfer (control signal transfer). As shown in FIG. 2 and FIG. 3, the radio interface protocol may be classified into L1 (first layer) including a physical (PHY) layer, L2 (second layer) including MAC/RLC/PDCP (medium access control/radio link control/protocol data convergence protocol) layers, and L3 (third layer) including RRC (radio resource control) layer, based on three lower layers of the open system interconnection (OSI) standard model widely known in the communications systems. These radio protocol layers exist in the user equipment UE and the E-UTRAN in pairs, and play a role in data transfer of the Uu interface.

Each layer of the radio protocol shown in FIG. 2 and FIG. 3 will be described as follows. FIG. 2 is a diagram illustrating a control plane of a radio protocol, and FIG. 3 is a diagram illustrating a user plane of a radio protocol.

The physical (PHY) layer belonging to the first layer L1 provides an information transfer service using a physical channel. The PHY layer is connected to a medium access control (MAC) layer above the physical layer via a transport channel. Data are transferred between the medium access control layer and the physical layer via the transport channel. At this time, the transport channel is divided into a dedicated transport channel and a common transport channel depending on channel sharing. Data are transferred between one physical layer of a transmitting side and the other physical layer of a receiving side through the physical channel.

Several layers exist in the second layer. First of all, the MAC layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an un-acknowledged mode (UM), and an acknowledged mode (AM) to ensure various quality of services (QoS) required by each radio bearer (RB). In particular, the AM RLC layer performs a retransmission function through automatic repeat and request (ARQ) function for reliable data transmission.

In order to effectively transmit data using IP packets such as IPv4 or IPv6 within a radio-communication interval having a narrow bandwidth, a PDCP (packet data convergence protocol) layer of the second layer performs header compression to reduce the size of IP packet header having relatively great size and unnecessary control information. The header compression is to increase transmission efficiency of the radio-communication interval by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service or logical path provided by the first and second layers of the radio protocol for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a passageway for transmitting RRC message in the control plane, and the DRB is used as a passageway for transmitting user data in the user plane.

Carrier Aggregation Technology

Figure 4:
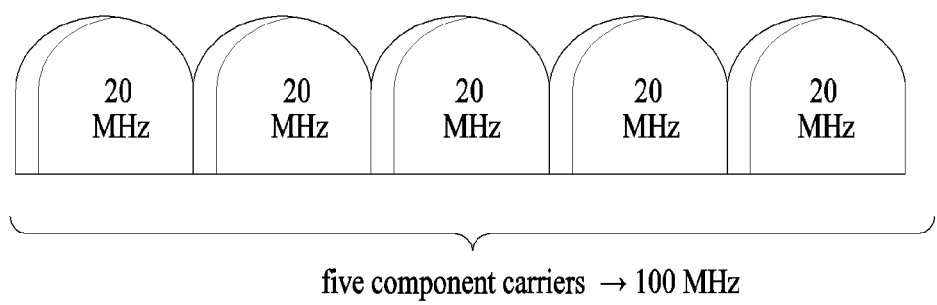
FIG. 4 is a diagram illustrating carrier aggregation.

The carrier aggregation (CA) technology that supports multiple carriers will be described with reference to FIG. 4.

The carrier aggregation technology may support a system bandwidth of maximum 100 MHz by grouping five component carriers (CCs) of a bandwidth unit (for example, 20 MHz) defined in the existing wireless communication system (for example, LTE system). The component carriers used for carrier aggregation may have the same size or different sizes. Also, the respective component carriers have their own frequency bands (or center frequency) different from each other. Also, although the respective component carriers may exist on a continuous frequency band, the component carriers existing on a discontinuous frequency band may be used for carrier aggregation. Also, in the carrier aggregation technology, a bandwidth of the uplink and a bandwidth of the downlink may be allocated symmetrically or asymmetrically to each other. Also, a serving cell of the LTE-A system may include one downlink CC and one uplink CC, or may include one downlink CC. However, one cell may include one uplink resource only in an advanced or another wireless communication system without limitation to the above example.

If the carrier aggregation technology is used, only one RRC connection exists between the user equipment and the base station. A plurality of serving cells configured to be used by the user equipment may be classified into PCell and SCell. The PCell may correspond to the serving cell that provides security input (for example, ECGI (E-UTRAN Cell Global Identifier), PCI (Physical Cell Identifier), ARFCN (Absolute Radio-Frequency Channel Number)) for establishment and re-establishment of RRC connection and mobility information (for example, TAI (tracking area identity)) of a non access stratum (NAS). The SCell may correspond to the other cells except for the PCell.

In configuring the plurality of serving cells, the PCell is always available, whereas the SCells may be added and released by the base station if necessary. After the SCells are added, the SCells may be used dynamically in accordance with activation/deactivation.

Figure 5:
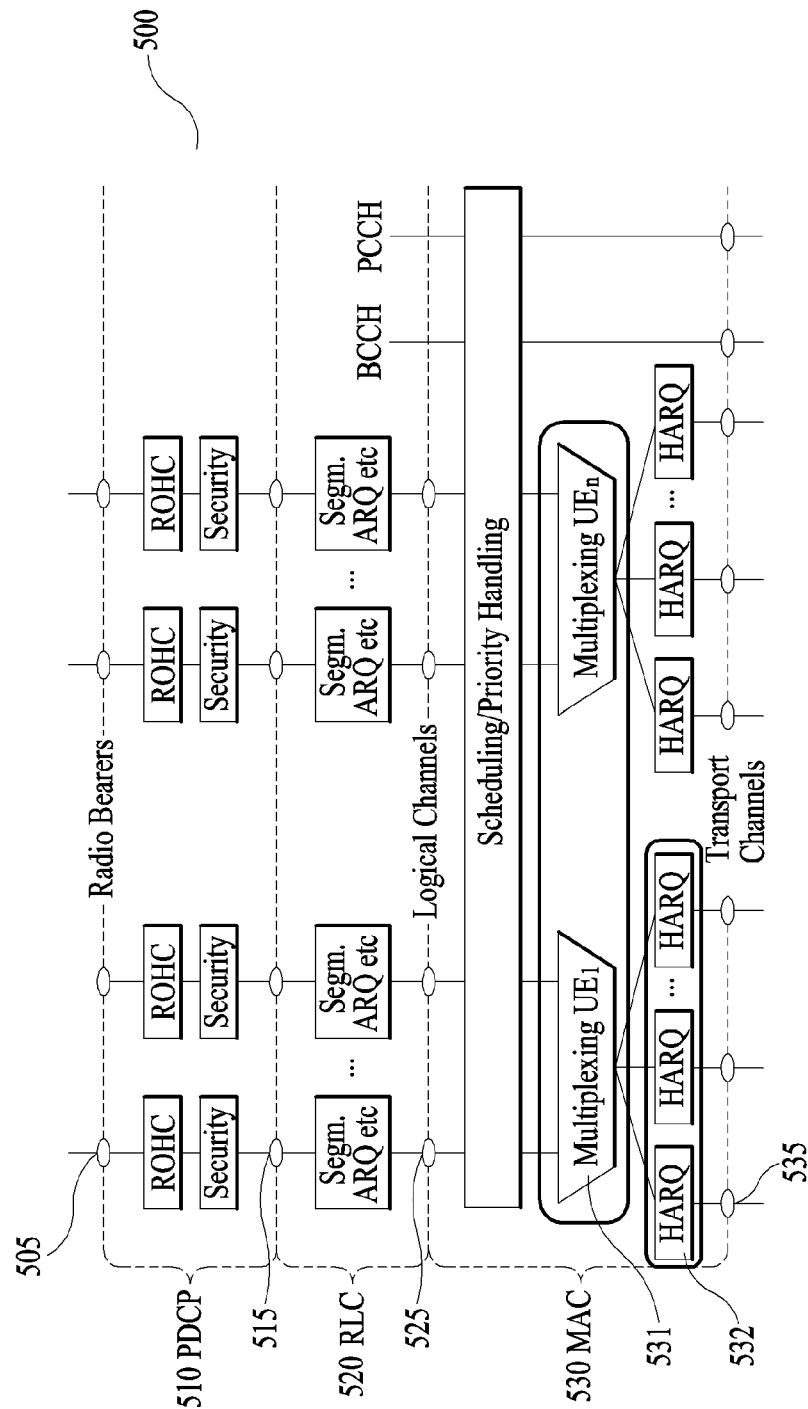
FIG. 5 is a diagram illustrating a structure of a downlink L2 (second layer) in carrier aggregation.
Figure 6:
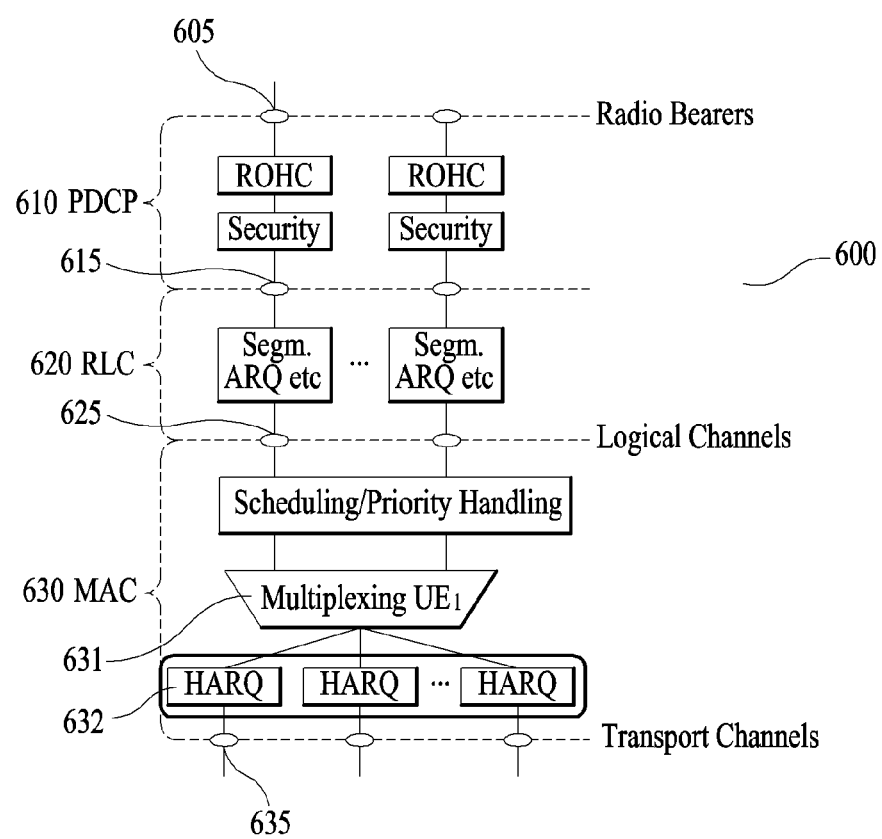
FIG. 6 is a diagram illustrating a structure of an uplink L2 (second layer) in carrier aggregation.
Figure 7:
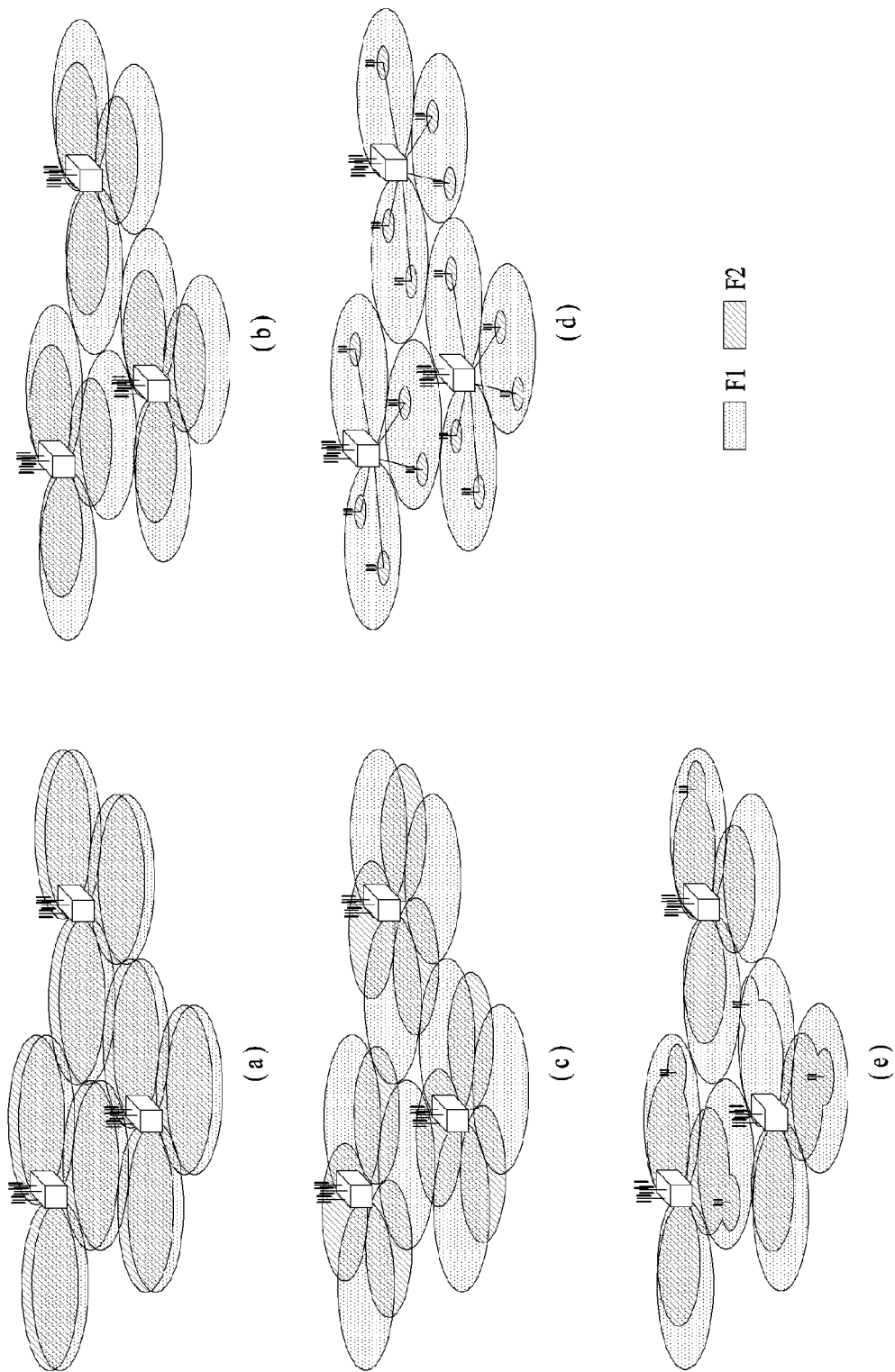
FIG. 7 is a diagram illustrating examples of an arrangement scenario of a carrier aggregation system.

A structure L2 (second layer) considering the carrier aggregation technology will be described with reference to FIGS. 5 and 6. FIG. 5 is a diagram illustrating a structure of downlink L2 (second layer) in carrier aggregation, and FIG. 6 is a diagram illustrating a structure of uplink L2 (second layer) in carrier aggregation.

In a downlink L2 structure 500 of FIG. 5, a PDCP layer 510, an RLC layer 520 and a MAC layer 530 are shown. In FIG. 5, elements 505, 515, 525 and 535 marked with circles in an interface between the respective layers represent service access points (SAP) for peer-to-peer communication. The SAP between a PHY channel (not shown) and the MAC layer provides a transport channel (535), and the SAP between the MAC layer and the RLC layer provides a logical channel (525). A general operation of each layer has been described above.

The MAC layer multiplexes a plurality of logical channels (that is, radio bearers) from the RLC layer. In the downlink L2 structure, a plurality of multiplexing entities 531 of the MAC layer are related to application of the multiple input multiple output (MIMO) technology. In a system that does not consider the carrier aggregation technology, since one transport channel is generated by multiplexing a plurality of logical channels in case of non-MIMO, one hybrid automatic repeat and request (HARQ) entity is provided to one multiplexing entity 531 (not shown).

In the meantime, in a system that considers the carrier aggregation technology, a plurality of transport channels corresponding to a plurality of component carriers are generated from one multiplexing entity 531. In this regard, in the carrier aggregation technology, one HARQ entity 532 manages one component carrier. Accordingly, the MAC layer 530 of the system that supports the carrier aggregation technology provides a plurality of HARQ entities 532 to one multiplexing entity 531. Also, since the respective HARQ entities 532 process a transport block independently, they may transmit and receive a plurality transport blocks through a plurality of component carriers at the same time.

In an uplink structure 600 of FIG. 6, the same operation as that of the downlink L2 structure 500 of FIG. 5 is performed except that one multiplexing entity 630 is included in one MAC layer 630. In other words, a plurality of HARQ entities 632 may be provided for a plurality of component carriers, the operations related to the plurality of HARQ entities 632 may be performed by the MAC layer 630, and the plurality of transport blocks may be transmitted and received through the plurality of component carriers at the same time.

Timing Alignment Maintenance

In the LTE system based on the orthogonal frequency division multiplex (OFDM) technology, communication between a user (or UE) and a base station may interfere with communication of other users. In order to minimize such interference, it is important that the base station manages transmission timing of the user equipment. In more detail, the user equipment may exist in a random region within a cell, and the time required for a signal transmitted from the user equipment to reach the base station may be varied depending on the location of each user equipment. In other words, the time required for the signal transmitted from the user equipment located at the cell edge to reach the base station will relatively be longer than the time required for the signal transmitted from the user equipment located at the center of the cell to reach the base station. On other hand, the time required for the signal transmitted from the user equipment located at the center of the cell to reach the base station will relatively be shorter than the time required for the signal transmitted from the user equipment located at the cell edge to reach the base station. In view of the base station, in order to minimize interference between the user equipments, since signals transmitted from all the user equipments within the cell are managed to reach the base station at the same time (or to belong to a predetermined time boundary), the base station may appropriately perform scheduling for each user equipment. For example, uplink transmission timing of the user equipment located at the cell edge is controlled to advance relatively more than a predetermined reference and uplink transmission timing of the user equipment located at the center of the cell is controlled to advance relatively less than a predetermined reference, whereby the uplink signals transmitted from each user equipment may be received by the base station at the same timing. This operation may be referred to as timing alignment maintenance, timing advance operation, or time synchronization.

A random access operation is one method for managing timing advance. In other words, the base station may receive a random access preamble transmitted from the user equipment through a random access procedure, and may calculate a timing advance value for making transmission timing of the user equipment UE fast or slow, by using information of the received random access preamble. And, the base station may notify the user equipment of the calculated timing advance value through a random access response, and the user equipment may update transmission timing by using the value.

As another method for managing timing advance, the base station may receive a sounding reference signal (SRS) from the user equipment periodically or randomly, calculate a time advance value of the user equipment through the received signal, and notify the user equipment of the calculated timing advance value through the received signal. As a result, the user equipment updates its transmission timing.

As described above, the base station may measure the transmission timing of the user equipment by using the random access preamble or the SRS, calculate a timing value for correction, and notify the user equipment of the calculated timing value. The timing advance value transmitted from the base station to the user equipment, that is, the timing value for correction will be referred to as a timing advance command (TAC). The timing advance command (TAC) is processed by the MAC layer. Since the user equipment does not always exist at a fixed location, the transmission timing of the user equipment is varied every time depending on the moving speed of the user equipment, the location of the user equipment, etc. Considering this, it is assumed that the timing advance command is effective for a specific time period not an infinite time if the user equipment once receives the timing advance command from the base station. To this end, a time alignment timer (TAT) is used. In other words, if the user equipment receives the timing advance command (TAC) from the base station, the user equipment initiates the time alignment timer (TAT). It is assumed that timing alignment of the user equipment is synchronized with timing alignment of the base station only if the TAT is running A value of the time alignment timer (TAT) may be transferred from the base station to the user equipment through RRC signal such as system information or radio bearer reconfiguration. Also, if the user equipment receives a new timing advance command from the base station while the time alignment timer is running, the user equipment resets the time alignment timer (TAT). If the time alignment timer (TAT) expires, or if the time alignment timer is not running, the user equipment assumes that its timing alignment is not synchronized with the timing alignment of the base station, and does not transmit any uplink data or a control signal (for example, data transmission based on a physical uplink shared channel (PUSCH) and control signal transmission based on a physical uplink control channel (PUCCH), except for the random access preamble.

A Plurality of Timing Advances

In the system that supports carrier aggregation, a plurality of timing advances may be applied to one user equipment. If a plurality of serving cells are configured for the user equipment, since the respective serving cells may have their respective frequency features different from each other, a plurality of timing alignment maintenances are required. If uplink transmission is tried on the plurality of serving cells in a state that transmission timing is not synchronized, inter-cell interference may occur. In the same manner as that timing alignment is managed per user to reduce interference between the users in the LTE system, it is required in the carrier aggregation system that uplink transmission timing of each serving cell having uplink CC should be adjusted properly to reduce inter-cell interference.

If the plurality of serving cells are configured for the user equipment, the serving cells having similar timing alignment features may exist depending on frequency features of the plurality of serving cells. For example, the serving cells within same frequency band may have similar timing alignment features. In this case, it is preferable to perform timing alignment maintenance per group by grouping the serving cells having similar timing alignment features instead of performing timing alignment maintenance per serving cell. For timing alignment, one or more serving cells may constitute one group. In this case, the group may be referred to as a timing advance group (TAG).

The base station may notify the user equipment of information on a TAG, in which each serving cell is included, through TAG identifier of the RRC signal. One user equipment may two or more TAGs, each of which may include one or more serving cells having similar uplink timing alignment features. If a plurality of serving cells are included in one TAG, at least one of the serving cells should have uplink resource (or uplink CC).

The following Table 1 illustrates a part of scenarios to which the carrier aggregation technology may be applied. In the scenarios described in Table 1, two serving cells may be referred to as F1 and F2, which may be understood as the center frequencies of the respective serving cells. Also, in the scenarios of the following Table 1, it is assumed that F1<F2.

TABLE 1

| Scenario | Description | Example |
|---|---|---|
| 1 | F1 and F2 are overlaid at the same location, and provide almost same coverage. Both two cells provide sufficient coverage, and mobility of a user may be supported by both two cells. Scenario 1 may correspond to a case where F1 and F2 exist at the same frequency bandwidth (for example, bandwidth of 2 GHz or bandwidth of 800 MHz, etc.). Carrier aggregation may be performed between overlaid cells F1 and F2. | FIG. 10(a) |
| 2 | Although F1 and F2 are overlaid at the same location, F2 has small coverage due to great path loss. F1 only provides sufficient coverage, and F2 may be used to improve throughput. Mobility of a user may be supported on the basis of coverage of F1. Scenario 2 may correspond to a case where F1 and F2 exist at different frequency bandwidths (for example, F1 exists at bandwidth of 800 MHz or bandwidth of 2 GHz, and F2 exists at bandwidth of 3.5 GHz). Carrier aggregation may be performed between overlaid cells F1 and F2. | FIG. 10(b) |
| 3 | Although F1 and F2 are overlaid at the same location, an antenna of F2 is configured towards the edge of the cell, whereby throughput of the cell may be improved. Although F1 provides sufficient coverage, F2 may have a potential hole due to great path loss, for example. Mobility of a user may be supported on the basis of coverage of F1. Scenario 3 may correspond to a case where F1 and F2 exist at different frequency bandwidths (for example, F1 exists at bandwidth of 800 MHz or bandwidth of 2 GHz, and F2 exists at bandwidth of 3.5 GHz). F1 and F2 of the same base station may be aggregated at the overlaid location of coverage. | FIG. 10(c) |
| 4 | F1 provides macro coverage, and F2 may correspond to remote radio head (RRH) used to increase throughput at a hot spot. Mobility of a user is supported on the basis of coverage of F1. Scenario 4 may correspond to a case where F1 and F2 exist at different frequency bandwidths (for example, F1 exists at bandwidth of 800 MHz or bandwidth of 2 GHz, and F2 exists at bandwidth of 3.5 GHz). F2 RRH cells may be aggregated with F1 macro cells. | FIG. 10(d) |
| 5 | Although scenario 5 is similar to scenario 2, the scenario 5corresponds to a case where a frequency selective relay is arranged and thus coverage is extended for one of carrier frequencies. F1 and F2 of the same base station may be aggregated at the overlaid location of coverage. | FIG. 10(e) |

In the examples of the above Table 1, since frequency features of the plurality of serving cells are similar to one another in the scenario 1, it is preferable that the serving cells belong to one TAG and one timing advance is applied to the user equipment. Since frequency features of the plurality of serving cells are different from one another in the scenarios 2, 3, 4 and 5, it is preferable that the serving cells belong to their respective TAGs different from one another and a plurality of timing advances are applied to the user equipment.

Hereinafter, a method for managing timing alignment per TAG will be described.

If the TAC is received from the base station, the user equipment initiates the TAT, and it is assumed that timing alignment of the user equipment is synchronized with timing alignment of the base station during only the operation of the TAT. In the carrier aggregation system, if a plurality of TAGs are configured for the user equipment, the user equipment manages timing alignment per TAG, whereby the TAT is running per TAG. In other words, the same timing advance value is applied to all the serving cells within the same TAG, and if the TAT expires, the serving cell(s) of the corresponding TAG cannot perform any uplink transmission except for the random access preamble.

Figure 8:
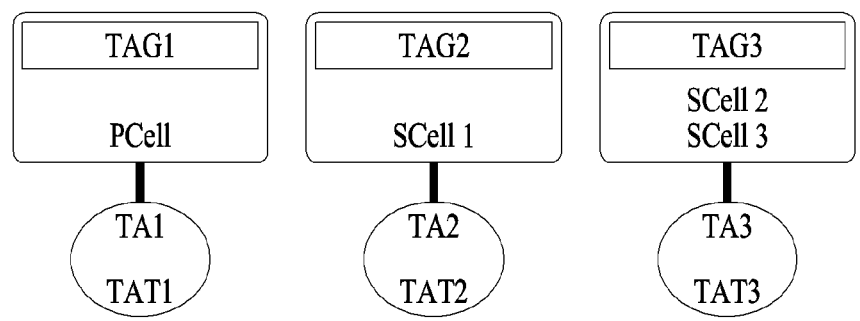
FIG. 8 is a diagram illustrating a timing advance operation according to a timing advance group (TAG)

FIG. 8 is a diagram illustrating a timing advance operation based on a timing advance group (TAG).

In the example of FIG. 8, it is assumed that four serving cells PCell, SCell1, SCell2 and SCell3 are configured for the user equipment. It may be configured in such a manner that the serving cells SCell2 and SCell3 of which timing alignment features are similar to each other belong to one TAG (that is, TAG3), and the serving cells PCell and SCell1 of which timing alignment features are not similar to each other belong to TAG1 and TAG2, respectively. A separate timing advance value and TAT may be given to each TAG.

In managing uplink timing alignment of the user equipment for which a plurality of serving cells are configured, the following rules may be defined.

One timing reference cell for synchronizing timing alignment may exist in each TAG, and a separate TAT value may be given to each TAG.

Timing alignment maintenance of TAG that includes PCell follows timing alignment maintenance defined in the existing wireless communication system (for example, 3GPP LTE release-10), and the PCell may be a reference cell.

When timing alignment is initially synchronized on the SCell belonging to TAG that does not include PCell, a random access procedure on the corresponding serving cell (that is, SCell) may be performed by only a command of the base station. In other words, even though uplink transmission is required, the random access procedure cannot start on the SCell without a command of the base station.

When timing alignment is synchronized in both the PCell and the SCell through the random access procedure, a non-contention based random access procedure is performed.

If the TAT of the TAG that includes PCell is not running, the TAT of the other TAGs cannot be running Timing advance of the wireless communication system that supports carrier aggregation may be applied in accordance with the above rules.

Power Headroom Report

In order that the user equipment transmits data to the base station, the transmission power of the user equipment should be controlled properly. If the transmission power of the user equipment is too low, the base station may not receive data normally. If the transmission power of the user equipment is too high, there is no problem in that the user equipment receives data of the corresponding user equipment. However, a problem may occur in that the base station receives transmission of another user equipment due to interference generated by an uplink signal of strong strength from the corresponding user equipment. Accordingly, in order to improve system throughput, it is required that the base station should determine an optimized power used for uplink transmission of the user equipment and notify the determined power of the user equipment.

The optimized transmission power used for uplink transmission of the user equipment may be determined by the receiving side (that is, base station). To this end, the receiving side should acquire necessary information from the user equipment. In this case, a power headroom report (PHR) of the user equipment may be used. The power headroom (PH) means the power that may further be used in addition to the power currently transmitted from the user equipment. In other words, the power headroom means the difference between the power (for example, nominal UE maximum transmission power) that may be transmitted from the user equipment and the power (for example, power estimated for uplink-shared channel (UL-SCH) transmission) used for current transmission.

If the base station is reported from the user equipment in respect of the power headroom, the base station determines the power which will be used for uplink transmission of next user equipment. The determined transmission power is represented by a size of a resource block and a modulation and coding scheme (MCS), and is reflected when UL grant is allocated to next user equipment. In other words, the base station may determine the uplink transmission power on the basis of a PHR provided from the user equipment and provide uplink transmission power control information to the user equipment.

The base station should receive a PHR from the user equipment to allocate the optimized transmission power to the user equipment. In this case, if the user equipment transmits the PHR too frequently, since waste of a radio resource may be caused, it is required that the user equipment should transmit the PHR only if necessary. For example, if any one of the following conditions is satisfied, the PHR is triggered:

A prohibitPHR-timer expires or has expired and the path loss has changed to exceed a predetermined reference value (for example, dl-PathlossChange dB) since the last transmission of the PHR when the user equipment has uplink resources for new transmission.

A periodicPHR-Timer expires; and

A PHR related parameter is configured or reconfigured.

After the PHR is triggered in accordance with the above conditions, if there is any uplink resource allocated for new transmission at a transmission time interval (TTI), the MAC layer performs PHR transmission through the following steps:

a power headroom value is transferred from the physical layer;

a PHR MAC CE (control element) is generated and transmitted using the power headroom value; and a periodicPHR-Timer is restarted.

In this way, the user equipment may report a power headroom report value to the base station by transmitting a MAC protocol data unit (PDU) that includes a PHR MAC CE. To this end, a logical channel ID (LCID) value for a PHR MAC CE is allocated to the UL-SCH (for example, LCID=11010). At this time, the PHR MAC CE has a format as shown in FIG. 9.

Figure 9:
FIG. 9 is a diagram illustrating a format of a PHR MAC CE.

FIG. 9 is a diagram illustrating a format of a PHR MAC CE.

In FIG. 9, R represents a reserved bit (1 bit size), and an actual power headroom value is reported through a PH field. For example, in the current LTE system, 6 bits are used for a PH field, whereby a level of a total of 64 (that is, 0 to 63) power headroom values may be notified.

PHR in Carrier Aggregation (CA) System

If a plurality of serving cells are configured for the user equipment (that is, in case of carrier aggregation), a PHR may be triggered, for example, when any one of the following conditions is satisfied.

A prohibitPHR-timer expires or has expired and the path loss has changed more than a predetermined reference value d1-PathlossChange dB for at least one activated Serving Cell which is used as a path loss reference since the last transmission of the PHR when the user equipment has UL resources for new transmission.

A periodicPHR-Timer expires.

A PHR related parameter is configured or reconfigured.

An uplink configured SCell is activated.

After the PHR is triggered in accordance with the above conditions, if the user equipment for which a plurality of serving cells are configured reports the PHR to the base station, the user equipment may perform the following operations.

The user equipment reports a PH value for each of all activated serving cells to the base station.

In PH calculation for each serving cell, the user equipment calculates a maximum output value of the user equipment for the corresponding serving cell and calculates the other output value as a PH by excluding the output value currently used by the corresponding serving cell from the maximum output value.

If the PHR is triggered and UL grant is allocated to partial serving cells only, the user equipment calculates the PH for the partial serving cells by using the allocated UL grant, and calculates the PH for the other serving cells by using a predetermined reference format.

The maximum output value of the user equipment for the serving cell is calculated as a value except for a power reduction part. The power reduction part may correspond to the amount of a forcibly reduced power of the user equipment when power backoff due to power management is used. In this case, the power reduction part may be used differently depending on implementation of the user equipment within a maximum power reduction (MPR) value.

In calculating a maximum output value of the user equipment, since a separate power reduction part may be applied to each user equipment in accordance with implementation of the user equipment within the MPR value, for more exact power headroom report, the user equipment transmits a PHR, which additionally includes a maximum output value $P_{CMAX,c}$ except for the power reduction part.

FIG. 10 is a diagram illustrating a format of an extended PHR MAC CE.

The user equipment may transmit a MAC PDU, which includes an extended MAC CE, and an LCID value for the extended PHR MAC CE is allocated to the UL-SCH (for example, LCID=11001).

In FIG. 10, a $C_i$ (i=1, 2, ..., 7) field is mapped into an index of SCell configured for the user equipment. If the $C_i$ field is s set to 1, it means that PH of the SCell mapped into the corresponding $C_i$ field exists. If the $C_i$ field is set to 0, it represents that a PH field of the SCell mapped into the corresponding $C_i$ field is not reported.

A "V" field indicates whether the PH value of the corresponding serving cell has been calculated using UL grant which is actually allocated or a reference format. If the V field is set to 1, it means that PH has been calculated using the reference format. If the V field is set to 0, it means that PH has been calculated using actual transmission. In more detail, in case of Type 1 PH, V=0 represents actual transmission on the PUSCH, and V=1 represents that a PUSCH reference format is used. In case of Type 2 PH, V=0 represents actual transmission on the PUCCH, and V=1 represents that a PUCCH reference format is used. Also, in both Type 1 and Type 2, V=0 represents that a related $P_{CMAX,c}$ field exists, and V=1 represents that the related $P_{CMAX,c}$ field is omitted.

A "PH" field indicates a power headroom level from 0 to 630 by using 6 bits similarly to the description in FIG. 9.

A "P" field indicates whether there is any change of $P_{CMAX,c}$ due to forcible reduction of the LTE transmission power (for example, due to application of power backoff) when the user equipment performs LTE transmission and transmission of the other radio access technology (RAT) at the same time. If the P field is set to 1, it means that there is change of $P_{CMAX,c}$ due to transmission of another RAT. In other words, if power backoff is not applied, the P field may be set to 1 when $P_{CMAX,c}$ may have different values.

The $P_{CMAX,c}$ field represents a maximum output value of the user equipment, which is used for PH calculation.

An "R" field is a reserved bit (1 bit size) and may be set to 0.

Improved PHR Method

As described above, if a PHR is triggered when a predetermined condition is satisfied, the user equipment may calculate a PH, configure a PHR MAC CE and transmit the configured PHR MAC CE to the base station. In case of carrier aggregation where a plurality of serving cells are configured for a user equipment, the PH may be calculated for all the serving cells which are activated, and an extended PHR MAC CE may be configured and then transmitted to the base station.

In this case, since the PHR relates to uplink transmission of the user equipment, if the PHR is reported even though uplink transmission is not performed, unnecessary resources may be wasted. For example, in case of carrier aggregation where a plurality of timing advances (or a plurality of time synchronizations) are used, a report of the PH for all the serving cells which are activated, to the base station may be unnecessary in case of the following cases.

Two TAGs TAG1 and TAG2 are configured for the user equipment.

Serving cells in TAG1 and TAG2 are activated.

Although a TAT of TAG1 is running, a TAT of TAG2 is not running

As described above, a TAT relates to uplink transmission of the user equipment, and it is assumed that timing alignment of the user equipment is not synchronized with timing alignment of the base station while the TAT is running In other words, in the above example, if a downlink is used for data transmission from the base station to the user equipment on serving cell(s) belonging to TAG2 but an uplink from the user equipment to the base station is not used, the serving cell(s) belonging to TAG2 are activated but the TAT of TAG2 may not be running In this case, according to the operation defined in the existing wireless communication system, since the serving cell(s) belonging to TAG2 are activated, if the PHR is triggered even though the TAT is not running, the PH for each of all the serving cells belonging to TAG2 is calculated and reported. However, since the PHR for a random serving cell is information required if the corresponding serving cell is used for the uplink, the PHR for the cell(s) belonging to TAG2 of which TAT is not running in the above example corresponds to unnecessary information.

Accordingly, various examples of the present invention in which the PHR is transmitted only if necessary will be suggested hereinafter.

According to the present invention, transmission of a PHR or trigger condition of the PHR is determined depending on running of the TAT, whereby an unnecessary PHR may be avoided in advance. This principle of the present invention may be applied to the case where one serving cell is configured for the user equipment but may especially be applied to the case where a plurality of serving cells are configured, whereby the user equipment may be avoided transmitting the PHR unnecessarily.

As a detailed example, the PHR may be triggered if any one of the following conditions is satisfied.

If a TAT for TAG, to which activated serving cells used as references for path loss belong, is running, path loss measured for the serving cell in which a related TAT is running has been changed to exceed a predetermined reference value, a prohibitPHR-timer expires or has expired, and the user equipment has uplink resources for new transmission.

If the TAT of TAG to which the serving cells belong is running, the serving cells are activated.

A timing advance procedure is completed for the first time after the serving cells are activated.

These PHR trigger conditions may applied to the existing PHR triggering conditions additionally or alternatively.

Next, even though the PHR is triggered by the aforementioned conditions or the other conditions, a method for transmitting the PHR only if necessary may be used additionally. For example, after the PHR is triggered, when the PH for each of the activated serving cells is calculated to configure a PHR MAC CE, if the TAT for TAG to which each serving cell belongs is not running, the PH for the corresponding serving cell may not be included in the PHR MAC CE. In other words, if the PHR is triggered, only the PH for the activated serving cell, which belongs to TAG of which TAT is running, may be included in the PHR MAC CE.

One or more of the following operations may be applied to the aforementioned operation related to PHR transmission and reception according to the present invention.

The base station may configure a TAT value for the user equipment through an upper layer (for example, RRC layer) signal such as system information and radio bearer reconfiguration. If the user equipment receives a TAC from the base station, the TAT of the corresponding TAG is started or restarted. In this way, the procedure of allowing the user equipment to receive the TAC from the base station and control uplink timing by using the TAC will be referred to as a timing advance procedure or a time synchronization procedure.

Also, the user equipment may measure path loss through the downlink of the serving cell. At this time, the corresponding serving cell will be referred to as path loss reference. The base station may set a path loss reference (that is, which serving cell should be used to measure path loss through its downlink) for the uplink of the serving cell through an upper layer signal. Also, a predetermined reference value (for example, d1-PathlossChange), which is a comparison reference of variation of path loss measured by the user equipment, may be set for the user equipment by the base station through an upper layer signal.

Also, the base station may set a value of the PHRprohibit-timer to the user equipment through the upper layer signal. If the user equipment transmits a MAC PDU, which includes a PHR MAC CE, to the base station, the PHRprohibit-timer is started or restarted. In this case, the PHR MAC CE may be the aforementioned extended PHR MAC CE or a PHR MAC CE of new configuration.

Also, the base station may command the user equipment to activate/deactivate the serving cell. The serving cell activation/deactivation command is transferred to the user equipment through a MAC control signal.

Alternatively, the user equipment may perform deactivation for the serving cell (for example, SCell) through a timer (for example, sCellDeactivationTimer) for each serving cell when activating the serving cell through a MAC control element. If the user equipment receives a PDCCH signal, which includes UL grant or DL assignment for the serving cell, from the base station, the user equipment may restart the predetermined timer. If the predetermined timer expires, the user equipment may deactivate the serving cell.

Figure 11:
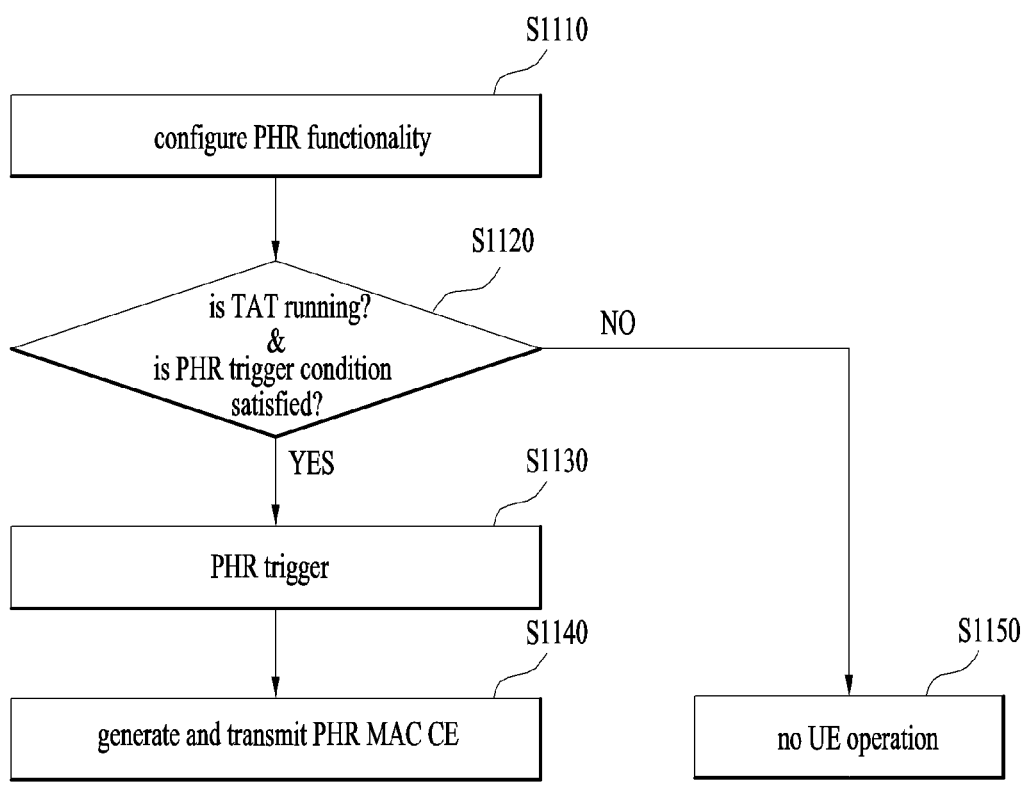
FIG. 11 is a flow chart illustrating a method for transmitting a PHR according to one embodiment of the present invention.

FIG. 11 is a flow chart illustrating a method for transmitting a PHR according to one embodiment of the present invention.

At step S1110, PHR functionality may be configured for the user equipment. This means that PHR functionality may be configured to allow the user equipment to report PHR to the base station.

At step S1120, the user equipment may determine whether the TAT is running and whether the PHR trigger condition is satisfied. In this case, whether the TAT is running may be determined in a unit of TAG for each of the serving cell(s) belonging to a random TAG. The PHR trigger condition may be defined if any one of the following cases is satisfied, that is, i) the case where the PHRprohibit-timer expires or has expired, and path loss for at least one activated serving cell (serving cell used as a reference for path loss) is changed to exceed a predetermined reference value after the last PHR transmission when the user equipment UE has uplink resources for new transmission, ii) the case where the uplink-configured SCell is activated, and iii) a TAC for TAG to which the corresponding serving cell belongs is received for the first time since the last activation of the serving cell. However, the PHR trigger condition is not limited to this and may include the aforementioned various conditions. If any one of the conditions is satisfied, it is determined that the PHR trigger condition is satisfied.

In this case, the operation for determining whether the TAT is running and whether the PHR trigger condition is satisfied may be understood that the serving cell for determining i) of the PHR trigger conditions is limited to the serving cell belonging to TAG of which TAT is running. Also, the operation for determining whether the TAT is running and whether the PHR trigger condition is satisfied may be understood that the serving cell for determining ii) of the PHR trigger conditions is limited to the serving cell belonging to TAG of which TAT is running Also, if iii) of the PHR trigger conditions is satisfied, it means that the TAT is running, whereby whether the TAT is running may not be determined separately.

At step S1120, if the TAT is running and at the same time the PHR trigger condition is satisfied, step S1130 may be performed, whereby the PHR may be triggered. Accordingly, at step S1140, the PHR MAC CE may be generated and transmitted. In this case, the PHR MAC CE may include only the PH for the serving cell that satisfies whether the TAT is running and the PHR trigger condition at the step S1120.

In the meantime, if the TAT is not running or any one of the PHR trigger conditions is not satisfied at the step S1120, step S1150 is performed, whereby the user equipment UE does not perform PHR transmission.

Figure 12:
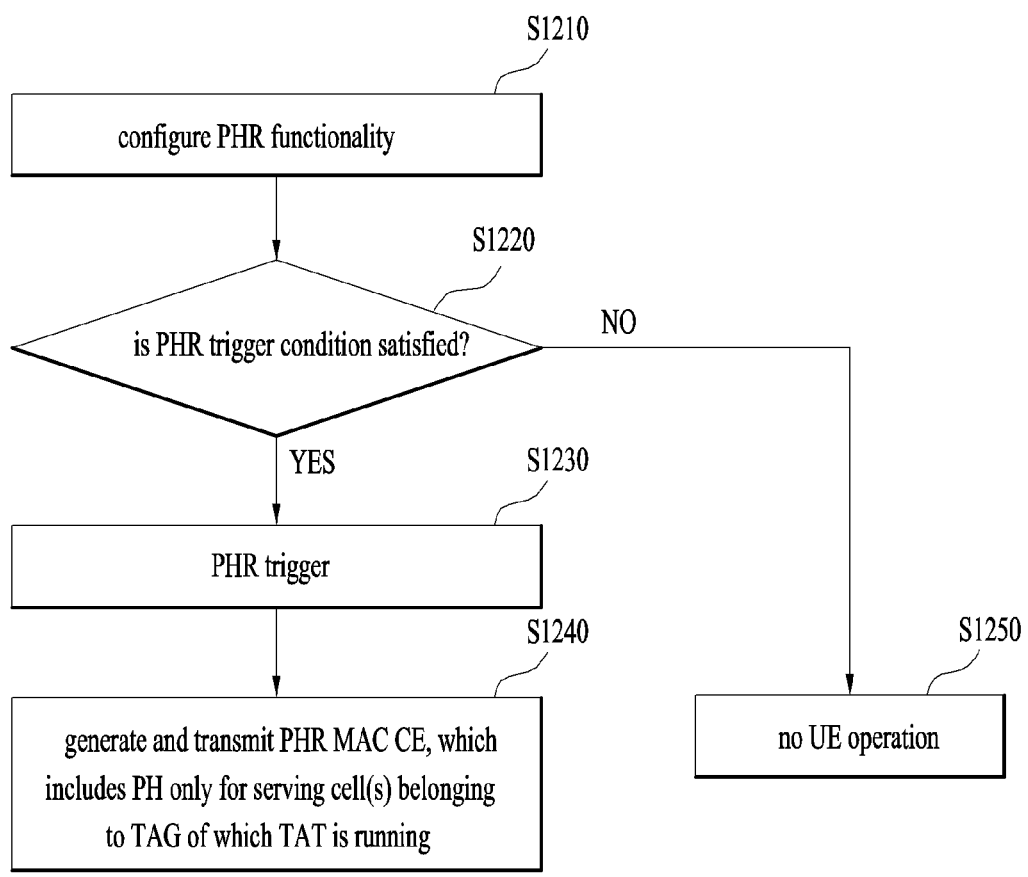
FIG. 12 is a flow chart illustrating a method for transmitting a PHR according to another embodiment of the present invention.

FIG. 12 is a flow chart illustrating a method for transmitting a PHR according to another embodiment of the present invention.

At step S1210, PHR functionality may be configured for the user equipment.

At step S1220, the user equipment may determine whether the PHR trigger condition is satisfied. Since a detailed example of the step S1220 is the same as the description in FIG. 11, the detailed example of the step S1220 will be omitted. If the PHR trigger condition is not satisfied at the step S1220, step S1250 is performed, whereby the user equipment does not perform PHR transmission.

If the PHR trigger condition is satisfied at the step S1220, step S1230 is performed, whereby the PHR is triggered.

At step S1240, the user equipment generates a PHR MAC CE. Only PH for the serving cell(s) belonging to TAG of which TAT is running may be calculated and included in the PHR MAC CE. In other words, unlike the method of FIG. 11, which determines whether the TAT is running together with the PHR trigger condition, in the method of FIG. 12, even though the PHR is triggered, a target included in the PHR MAC CE is limited to the PH for the serving cell belonging to TAG of which TAT is running, whereby unnecessary information (for example, the PHR for serving cell that does not use uplink) may not be transmitted.

Figure 13:
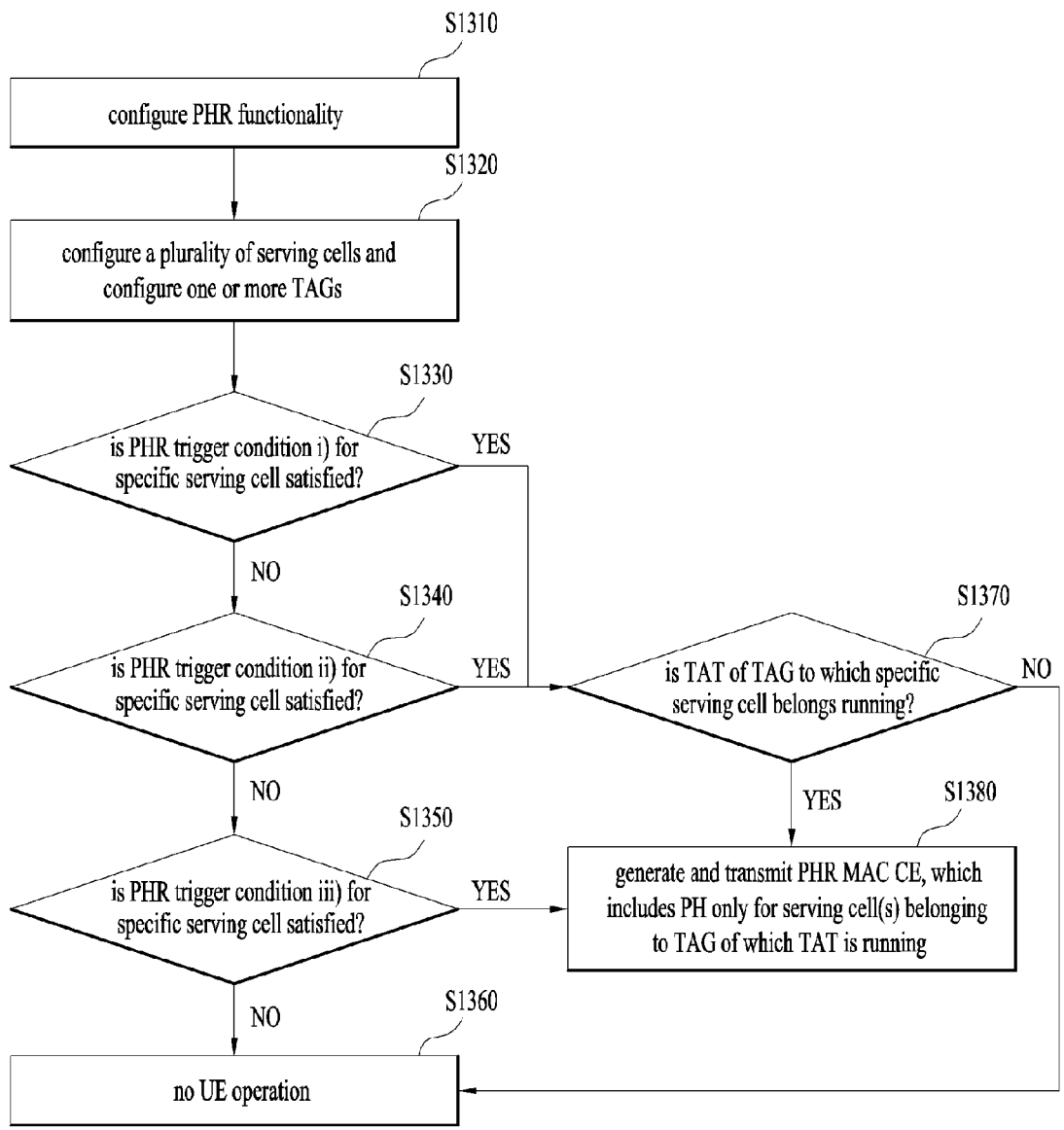
FIG. 13 is a flow chart illustrating a method for transmitting a PHR according to other embodiment of the present invention.

FIG. 13 is a flow chart illustrating a method for transmitting a PHR according to other embodiment of the present invention.

At step S1310, PHR functionality may be configured for the user equipment.

At step S1320, a plurality of serving cells may be configured for the user equipment. Also, a plurality of TAGs that uses a plurality of timing advances (or a plurality of time synchronizations) may be configured for the user equipment.

At step S1330, the user equipment may determine whether the PHR trigger condition i) is satisfied. In more detail, the user equipment may determine whether the PHR trigger condition based on variation of path loss measured for a specific serving cell is satisfied. Also, the user equipment may determine whether the PHRprohbit-timer has currently expired. Also, the user equipment may determine whether variation of the measured result of path loss for the serving cell activated after the last PHR transmission and used as a path loss reference is greater than a reference value (for example, dl-PathlossChange) set by the base station. Also, the user equipment may determine whether UL grant for new transmission is allocated. If any one of the above conditions is not satisfied, the user equipment may perform step S1340.

At step S1340, the user equipment may determine whether the PHR trigger condition ii) is satisfied. In more detail, the user equipment may determine whether the serving cell of which uplink is configured has been activated.

If any one of the steps S1330 and S1340 is satisfied, the user equipment may perform step S1370. At the step S1370, the user equipment may determine whether the TAT of TAG to which the serving cell (or SCell) related to the step S1330 or S1340 belongs is running In the meantime, if the PHR trigger condition ii) of the step S1340 is not satisfied, the user equipment may perform step S1350. At the step S1350, the user equipment may perform whether the PHR trigger condition iii) is satisfied. In more detail, the user equipment may determine whether the time synchronization procedure has been performed for the first time after the serving cell (or SCell) of which uplink synchronization is not matched with uplink synchronization of the user equipment is activated. For example, in a state that the SCell is deactivated and the TAT of TAG corresponding to the SCell is not running, after the SCell is activated, the user equipment may receive a TAC for TAG corresponding to the SCell and determine that the time synchronization procedure has been performed for the first time when the corresponding TAT is started. In this way, when the time synchronization procedure is performed for the first time after the serving cell is activated, the PHR trigger condition may be defined, whereby the user equipment may be avoided unnecessarily transmitting the PHR, and the base station may report the PHR at the time when the serving cell is actually scheduled. As a result, efficiency in use of the radio resources may be improved.

If the result of the step S1350 or step S1370 is YES, step S1380 may be performed. At the step S1380, the user equipment may trigger the PHR, and generate and transmit a PHR MAC CE. In this case, when UL grant is allocated, the user equipment may configure a PHR MAC CE, which includes the PH only for the serving cell(s) of TAG of which TAT is running, and may transmit a MAC PDU, which includes the configured PHR MAC CE, to the base station.

If the result of the step S1350 or step S1370 is NO, step S1360 may be performed, and the user equipment may not perform PHR transmission.

In the example of FIG. 13, although the steps S1330, S1340 and S1350 are performed in due order, the present invention is not limited to the example of FIG. 13, and the steps S1330, S1340 and S1350 may be performed in a random order. Also, some or all of the steps S1330, S1340 and S1350 may be performed in parallel.

The aforementioned various embodiments of the present invention may independently be applied to the aforementioned PHR transmission and reception operation of the present invention, or two or more embodiments may simultaneously be applied to the aforementioned PHR transmission and reception operation, and repeated description will be omitted for clarification.

Figure 14:
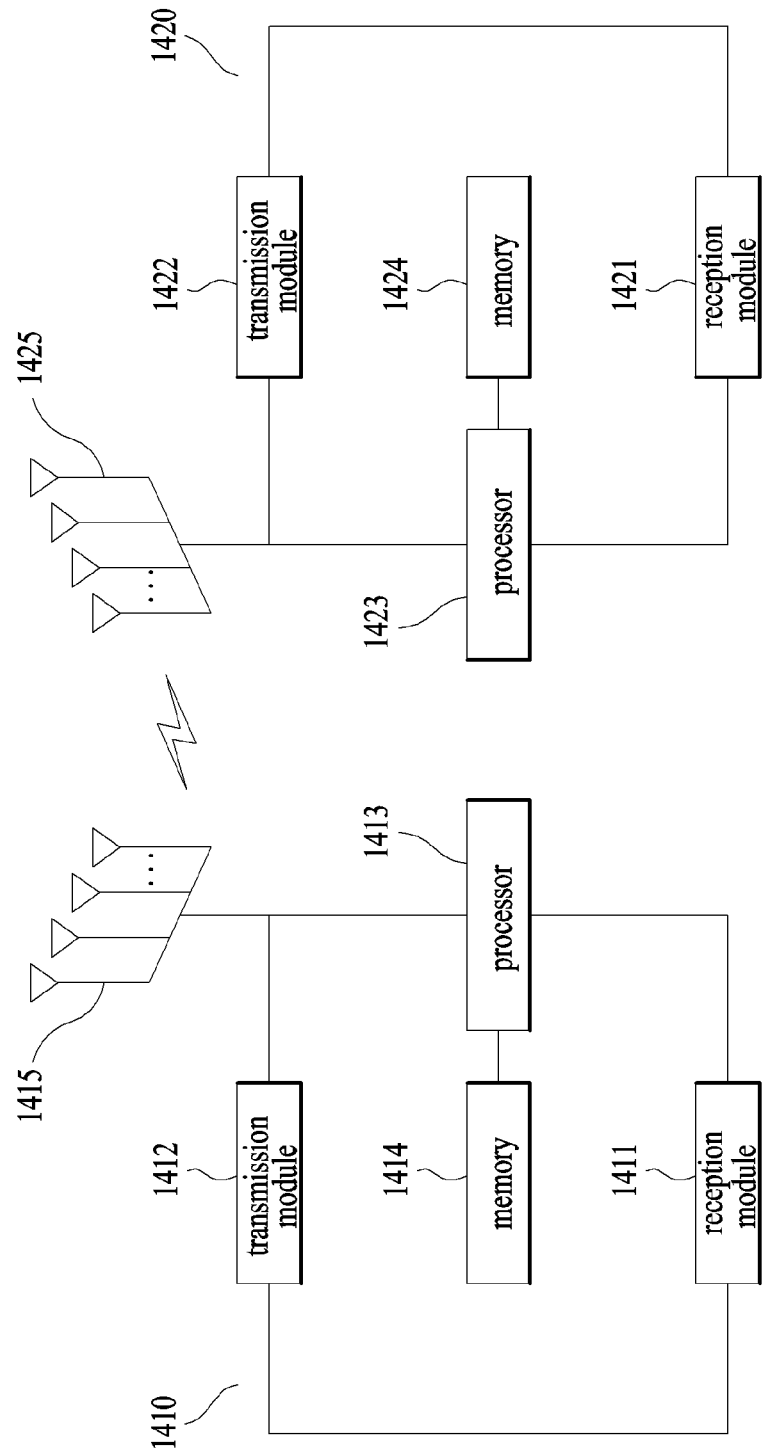
FIG. 14 is a diagram illustrating a configuration of a preferred embodiment of a base station and a user equipment according to the present invention.

FIG. 14 is a diagram illustrating a preferred embodiment of a base station 1410 and a user equipment 1420 according to the present invention.

Referring to FIG. 14, the base station 1410 of the present invention may include reception module 1411, a transmission module 1412, a processor 1413, a memory 1414, and a plurality of antennas 1415. The plurality of antennas 1415 mean the base station that supports MIMO transmission and reception. The reception module 1411 may receive various kinds of signals, data and information on an uplink from the user equipment. The transmission module 1412 may transmit various kinds of signal, data and information on a downlink to the user equipment. The processor 1413 may control the overall operation of the base station 1410.

The base station 1410 according to one embodiment of the present invention may be configured to control the uplink transmission power of the user equipment 1420. The processor 1413 of the base station 1410 may be configured to receive a power headroom report (PHR), which includes power headroom information only for the serving cell of which TAT is running, from the user equipment 1420 through the reception module 1410. Also, the processor 1413 may be configured to transmit the uplink transmission power control information determined on the basis of the PHR to the user equipment 1420 through the transmission module 1412.

In addition, the processor 1413 of the base station 1410 performs an operation for information received by the base station 1410, information to be transmitted to the outside, etc., and the memory 1414 may store the operation processed information for a predetermined time and may be replaced with an element such as a buffer (not shown).

Referring to FIG. 14, the user equipment 1420 of the present invention may include reception module 1421, a transmission module 1422, a processor 1423, a memory 1424, and a plurality of antennas 1425. The plurality of antennas 1425 mean the user equipment that supports MIMO transmission and reception. The reception module 1421 may receive various kinds of signals, data and information on a downlink from the base station. The transmission module 1422 may transmit various kinds of signal, data and information on an uplink to the base station. The processor 1423 may control the overall operation of the user equipment 1420.

The user equipment 1420 according to one embodiment of the present invention may be configured to transmit a power headroom report (PHR). The processor 1423 of the user equipment 1420 may be configured to determine whether the TAT for the serving cell is running Also, the processor 1423 may be configured to transmit the PHR, which includes power headroom information only for the serving cell of which TAT is running, to the base station 1410 through the transmission module 1422.

In addition, the processor 1423 of the user equipment 1420 performs an operation for information received by the user equipment 1420, information to be transmitted to the outside, etc., and the memory 1424 may store the operation processed information for a predetermined time and may be replaced with an element such as a buffer (not shown).

The details of the aforementioned base station and the aforementioned user equipment may be configured in such a manner that the aforementioned various embodiments of the present invention may independently be applied to the aforementioned base station and the aforementioned user equipment, or two or more embodiments may simultaneously be applied to the aforementioned base station and the aforementioned user equipment, and repeated description will be omitted for clarification.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various mobile communication systems.

The invention claimed is:

1. A method for transmitting a power headroom report (PHR) from a user equipment (UE), the method comprising:
    determining, by the UE, that a PHR trigger condition is satisfied for at least one of a plurality of timing advance groups (TAGs) configured for the UE, each of the TAGs including a plurality of serving cells which share a common timing advance value, wherein the PHR trigger condition includes a case where a prohibit PHR-timer has expired and path loss for at least one serving cell has changed more than a predetermined value; and
    determining, by the UE, whether a time alignment timer (TAT) is running for the at least one TAG for which the PHR trigger condition is satisfied;
    generating, by the UE, a medium access control protocol data unit (MAC PDU), which includes, when it is determined that the TAT is running, power headroom information for one or more serving cells included in the at least one TAG for which the PHR trigger condition is satisfied; and
    transmitting, by the UE to a base station, the generated MAC PDU.

2. The method according to claim 1, wherein the predetermined value is a predetermined reference value which is used as a path loss reference since the last transmission of the PHR when the user equipment has uplink resources for new transmission.

3. The method according to claim 2, wherein the serving cell used as the path loss reference is configured by the base station through upper layer signaling.

4. The method according to claim 2, wherein the predetermined reference value is set by the base station through upper layer signaling.

5. The method according to claim 1, wherein the PHR trigger condition further includes a case where an uplink is configured for the serving cell and the serving cell has been activated.

6. The method according to claim 1, wherein the PHR trigger condition further includes a case where a time alignment procedure for the serving cell has been performed for the first time after the last activation of the serving cell.

7. A user equipment (UE) for transmitting a power headroom report (PHR), the UE comprising:
    a reception module that receives a downlink signal from a base station;
    a transmission module that transmits an uplink signal to the base station; and
    a processor that:

controls the UE, which includes the reception module and the transmission module, determines that a PHR trigger condition is satisfied for at least one of a plurality of timing advance groups (TAGs) configured for the UE, each of the TAGs including a plurality of serving cells which share a common timing advance value, wherein the PHR trigger condition includes a case where a prohibit PHR-timer has expired and path loss for at least one serving cell has changed more than a predetermined value; and determines whether a time alignment timer (TAT) is running for the at least one TAG for which the PHR trigger condition is satisfied;

generates a medium access control protocol data unit (MAC PDU), which includes, when it is determined that the TAT is running, power headroom information for one or more serving cells included in the at least one TAG for which the MIR trigger condition is satisfied; and transmits, to a base station, the generated MAC PDU.

* * * * *